US012381876B2

(12) United States Patent
Jeffords et al.

(10) Patent No.: US 12,381,876 B2
(45) Date of Patent: Aug. 5, 2025

(54) ANOMALY-BASED MITIGATION OF ACCESS REQUEST RISK

(71) Applicant: Microsoft Technology Licensing, LLC, Redmond, WA (US)

(72) Inventors: Christopher Michael Jeffords, Bothell, WA (US); Srikanth Bolisetty, Redmond, WA (US); Ayala Miller, Bellevue, WA (US); Pavan Gopal Bandla, Duvall, WA (US); Ramin Leonard Halviatti, Kirkland, WA (US); LiLei Cui, Sammamish, WA (US); James Matthew Atkins, Redmond, WA (US); Jessica Michelle Satnick, Seattle, WA (US); Ravi Kumar Lingamallu, Redmond, WA (US); Ahmed Awad-Idris, Sammamish, WA (US); Amritaputra Bhattacharya, Bellevue, WA (US); Sunil Pai, Yarrow Point, WA (US); Kaymie Sato-Hayashi-Kagawa Shiozawa, Cambridge, MA (US); Noah Bergman, Walnut Creek, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 417 days.

(21) Appl. No.: 17/237,872

(22) Filed: Apr. 22, 2021

(65) Prior Publication Data
US 2022/0345457 A1    Oct. 27, 2022

(51) Int. Cl.
*H04L 9/40*    (2022.01)
*G06N 5/04*    (2023.01)
*G06N 20/00*   (2019.01)

(52) U.S. Cl.
CPC ............... *H04L 63/10* (2013.01); *G06N 5/04* (2013.01); *G06N 20/00* (2019.01); *H04L 63/1425* (2013.01)

(58) Field of Classification Search
CPC ............. H04L 63/10–108; H04L 63/14–1433
See application file for complete search history.

(56) References Cited

U.S. PATENT DOCUMENTS 9,160,742 B1 * 10/2015 Ackerman .......... H04L 63/0876
10,572,877 B2 * 2/2020 Aquino .............. G06Q 20/4016
(Continued)

FOREIGN PATENT DOCUMENTS

JP    2022069098 A  *  5/2022

OTHER PUBLICATIONS

"International Search Report and Written Opinion Issued in PCT Application No. PCT/US22/023202", Mailed Date: Jun. 28, 2022, 12 Pages.

(Continued)

*Primary Examiner* — Madhuri R Herzog

(57) ABSTRACT

Access to secured items in a computing system is requested instead of being persistent. Access requests may be granted on a just-in-time basis. Anomalous access requests are detected using machine learning models based on historic patterns. Models utilizing conditional probability or collaborative filtering also facilitate the creation of human-understandable explanations of threat assessments. Individual machine learning models are based on historic data of users, peers, cohorts, services, or resources. Models may be weighted, and then aggregated in a subsystem to produce an access request risk score. Scoring principles and conditions utilized in the scoring subsystem may include probabilities, distribution entropies, and data item counts. A feedback loop allows incremental refinement of the subsystem. Anomalous (Continued)

requests that would be automatically approved under a policy may instead face human review, and low threat requests that would have been delayed by human review may instead be approved automatically.

20 Claims, 6 Drawing Sheets

(56) References Cited

U.S. PATENT DOCUMENTS

| | | | |
|---|---|---|---|
| 10,686,600 B1* | 6/2020 | Vo | G06F 21/33 |
| 10,929,756 B1* | 2/2021 | Sadaghiani | G06F 9/3001 |
| 11,354,613 B2* | 6/2022 | Mondal | G06Q 10/0635 |
| 2003/0182549 A1 | 9/2003 | Hallin et al. | |
| 2003/0195951 A1 | 10/2003 | Wittel et al. | |
| 2005/0104894 A1 | 5/2005 | Sanborn et al. | |
| 2005/0146533 A1 | 7/2005 | Sanborn et al. | |
| 2006/0053178 A1 | 3/2006 | van Ingen et al. | |
| 2006/0053182 A1 | 3/2006 | Sen et al. | |
| 2006/0053304 A1 | 3/2006 | Fries et al. | |
| 2007/0000999 A1* | 1/2007 | Kubo | G06Q 40/00 235/380 |
| 2007/0220320 A1 | 9/2007 | Sen et al. | |
| 2010/0262583 A1 | 10/2010 | Ingen et al. | |
| 2012/0226613 A1* | 9/2012 | Adjaoute | G06Q 40/02 705/44 |
| 2015/0286812 A1 | 10/2015 | Mhatre et al. | |
| 2015/0363791 A1* | 12/2015 | Raz | G06Q 30/0185 705/318 |
| 2017/0134392 A1 | 5/2017 | Chattopadhyay et al. | |
| 2017/0230369 A1 | 8/2017 | Chanda | |
| 2017/0244723 A1 | 8/2017 | Prasad et al. | |
| 2017/0244760 A1 | 8/2017 | Prasad et al. | |
| 2018/0041614 A1 | 2/2018 | Ben-Chen et al. | |
| 2018/0213049 A1 | 7/2018 | Hegde et al. | |
| 2018/0288063 A1 | 10/2018 | Koottayi et al. | |
| 2018/0376520 A1 | 12/2018 | Pai et al. | |
| 2019/0286813 A1 | 9/2019 | Lounsberry et al. | |
| 2019/0378186 A1* | 12/2019 | Merdinger | G06Q 30/0609 |
| 2020/0045056 A1 | 2/2020 | Prasad et al. | |
| 2020/0045083 A1 | 2/2020 | Prasad et al. | |
| 2020/0145425 A1* | 5/2020 | Chauhan | H04L 63/107 |
| 2020/0302074 A1 | 9/2020 | Little et al. | |
| 2020/0334095 A1* | 10/2020 | Xu | G06F 11/0772 |
| 2021/0295427 A1* | 9/2021 | Shiu | G06N 5/04 |

OTHER PUBLICATIONS

"Access control", retrieved from <<https://en.wikipedia.org/wiki/Access_control>>, Mar. 12, 2021, 15 pages.
"Conditional probability", retrieved from <<https://en.wikipedia.org/wiki/Conditional_probability>>, Mar. 7, 2021, 10 pages.
"Explainable artificial intelligence", retrieved from <<https://en.wikipedia.org/wiki/Explainable_artificial_intelligence>>, Mar. 29, 2021, 10 pages.
"Just-in-Time (JIT) access", retrieved from <<https://www.ssh.com/iam/just-in-time>>, copyright 2020, 3 pages.
"Secure your management ports with just-in-time access", retrieved from <<https://docs.microsoft.com/en-us/azure/security-center/security-center-just-in-time?tabs=jit-config-asc%2Cjit-request-asc>>, Jul. 12, 2020, 8 pages.
"Reinforcement learning", retrieved from <<https://en.wikipedia.org/wiki/Reinforcement_learning>>, Apr. 2, 2021, 13 pages.
Frank Preiswerk, "Shannon entropy in the context of machine learning and AI", retrieved from <<https://medium.com/swlh/shannon-entropy-in-the-context-of-machine-learning-and-ai-24aee2709e32>>, Jan. 4, 2018, 7 pages.
"onelogin", retrieved from <<https://www.onelogin.com/>>, retrieved Apr. 11, 2021, 4 pages.
"Privileged Access Management", retrieved from <<https://www.empowerid.com/en/privileged-access-management>>, retrieved Apr. 11, 2021, 6 pages.
"VMware", retrieved from <<https://en.wikipedia.org/wiki/VMware>>, Apr. 1, 2021, 16 pages.
"Okta (identity management)", retrieved from <<https://en.wikipedia.org/wiki/Okta_(identity_management)>>, Mar. 23, 2021, 4 pages.
"Amazon Web Services", retrieved from <<https://en.wikipedia.org/wiki/Amazon_Web_Services>>, Apr. 8, 2021, 15 pages.
"Privileged Access Management in Google Cloud Platform", retrieved from <<https://services.google.com/fh/files/misc/privileged-access-management-gcp-wp.pdf>>, Oct. 2020, 13 pages.
"IBM Security Privileged Identity Manager V2.1.1 Documentation PDFs", retrieved from <<https://www.ibm.com/support/pages/ibm-security-privileged-identity-manager-v211-documentation-pdfs>>, Jun. 16, 2018, 2 pages.
"The Enterprise Identity Cloud", retrieved from <<https://saviynt.com/>>, retrieved Apr. 11, 2021, 7 pages.
"What is Zero Trust Privilege?", retrieved from <<https://www.centrify.com/education/what-is-zero-trust-privilege/>>, retrieved Apr. 11, 2021, 7 pages.
"Award-Winning Identity Access Management", retrieved from <<https://optimalidm.com/>>, retrieved Apr. 11, 2021, 6 pages.

* cited by examiner

| SOME ASPECTS OF SOME MACHINE LEARNING MODEL SUBSYSTEMS 214 | |
|---|---|
| SCORING CONDITION 422 | IP ADDRESS / CATEGORY 442 / 444 |
| CHANNEL 424 IDENTIFICATION / CATEGORY 426 / 428 | |
| DOMAIN 430 IDENTIFICATION / CATEGORY 432 / 434 | |
| SUBNET 436 IDENTIFICATION / CATEGORY 438 / 440 | |
| RESOURCE 332 IDENTIFICATION / CATEGORY 446 / 448 | WEIGHT 480 |
| REQUEST RESOURCE COUNT / LEVEL 450 / 452 | SPIKE 476 |
| PERSONNEL IDENTIFICATION / CATEGORY 454 / 456 | ALERT 478 |
| SERVICE 328 IDENTIFICATION / CATEGORY 458 / 460 | EMBEDDING 474 |
| REQUESTOR RISK SCORE 462 | RESOURCE / SERVICE RISK SCORE 464 / 466 |
| SCORING EXPLANATION 468 | SCORES TOLERANCE 470 |
| ENTROPY 416 THRESHOLD 472 | PROBABILITY 412 / COUNT 420 |
| JOB 406 RESPONSIBILITY 408 ACCESS LEVEL 410 | ATTRIBUTE 414 |
| MANAGER 402 DIRECT REPORT 404 | REQUESTS DISTRIBUTION 418 |

Fig. 4

| SOME ASPECTS OF SOME APPROVAL PROCEDURES 220 | |
|---|---|
| STEP-UP PROCEDURE 502 | STEP-DOWN PROCEDURE 504 |
| RULES 506 OR POLICIES 508 | STAKEHOLDER 510 |

Fig. 5

ANOMALY-BASED MITIGATION OF ACCESS REQUEST RISK

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, penetration testing is routinely used to evaluate cybersecurity. A penetration test is a simulated cyberattack which may reveal unknown vulnerabilities and exercise defensive mechanisms and procedures. Penetration testing may proceed through several phases: reconnaissance to gather information about a target computing system, scanning with tools to identify open ports or other security vulnerabilities, payload deployment to gain access, exploitation to gather or encrypt confidential data or install malware inside a breached system, persistence to install backdoors or other mechanisms to maintain access, and track covering to remove evidence of the breach. Although penetration testing often yields valuable information, it also perpetuates widely held assumptions about cybersecurity, including an us-versus-them mindset, and the paramount importance of a strong security perimeter.

SUMMARY

Some embodiments taught herein move beyond a view of security as something that is defined primarily by a perimeter. Security is viewed instead as appropriately controlling access to a given item by a given person at a given time. This view of security as both pervasive and adaptive promotes the protection of an organization's data and other assets against accidental damage or malicious misuse, either by organization insiders or by external attackers who breached a perimeter. Teachings provided herein also promote efficiency and productivity.

Some embodiments use or provide a hardware and software combination which is configured to mitigate cybersecurity risk from requests for access to services or other resources. A computing system is configured, e.g., by tailored software, to perform cybersecurity risk mitigation steps which include obtaining from a machine learning model subsystem an anomaly-based risk score of a request for access to a secured resource or a secured service or both, selecting an approval procedure based on at least the anomaly-based risk score, submitting the request to the selected approval procedure, getting an access decision from the approval procedure, and implementing the access decision. The access decision implementation may allow the requested access, bar the requested access, or submit the request to additional approval processing, for example. The computing system may include one, a few, or many machines.

Some embodiments provide or use a method for mitigating cybersecurity risk, including receiving a request for access to a secured resource or a secured service or both, computing an anomaly-based risk score of the request using a weighted combination of historical access pattern models, selecting an approval procedure based on at least the anomaly-based risk score, submitting the request to the selected approval procedure, getting an access decision from the approval procedure; and providing the access decision to an access control infrastructure for implementation of the access decision. Some embodiments provide or use a computer-readable storage device configured with data and instructions which upon execution by a processor cause a computing system to perform such a method of access request risk mitigation.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of some machine learning model subsystems;

FIG. 5 is a block diagram illustrating some aspects of some access request approval procedures;

DETAILED DESCRIPTION

Overview

Figure 1:
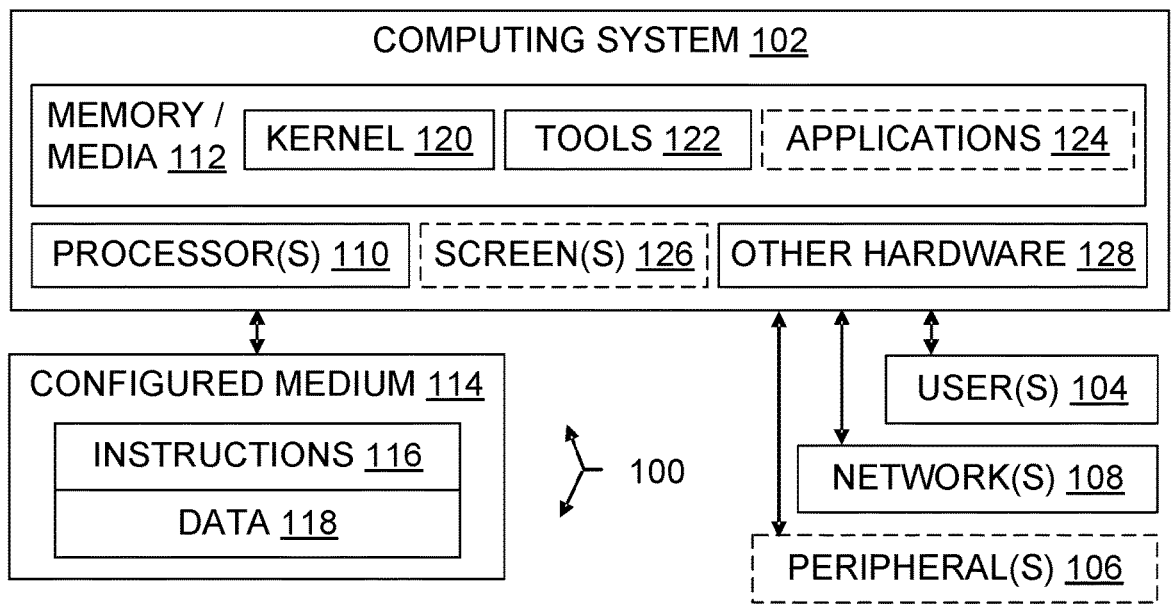
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by insights gained as innovators worked to improve the effectiveness and usability of security controls to protect Microsoft computing environments against attacks coming from inside a security perimeter.

Just-In-Time ("JIT") access control provides temporary elevated access by internal Microsoft engineers to first party Azure® resources, so that those engineers can debug production issues or perform other customer support operations (mark of Microsoft Corporation). JIT access control supports elevated access to very sensitive resources. Accordingly, JIT access control helps ensure that production access is not persistent, and is based squarely on least privilege access principles.

Many cyberattacks begin with compromised or misused accounts. But some access control approaches do not include security controls that address technical challenges such as how to detect compromised accounts or how to detect accounts that are being used maliciously to gain access to production systems. Some corresponding technical challenges are how to perform such detections in a manner that uses computational resources efficiently, provides actionable results quickly enough to maintain developer productivity, and gives developers and administrators acceptable explanations of calculated risk assessments.

In response to these challenges, innovators developed an algorithm which combines Machine Learning (ML) based analytics together with rule-based analytics to provide useful security insights for elevated access management. This technology, which may be referred to informally as "Intelligent JIT", identifies suspicious (anomalous) JIT access activity by comparing an elevated access request with historical access patterns. The anomalies may trigger actions such as alerting security investigators and resource owners of suspicious activity, informing elevation reviewers of consequences of approving access, and providing forensic information during security breach investigations.

Some embodiments described herein recognize JIT access policies. An owner of a service or other resource (e.g., a virtual machine) may configure access policies that prescribe conditions to meet in order for access to the resource to be granted. In customer data access scenarios, an engineer may request access to a resource; that request is evaluated against the JIT policies. If the request meets the conditions set in the resource owner's access policies, an email is sent to an authorized approver, who then evaluates the request and either approves or denies the request using a JIT portal. While evaluating the request, JIT access control will calculate an anomaly-based risk score that is then presented to the authorized approver, so they can make an informed decision before approving or denying the request. If the request is approved, JIT access control will provision access, and will then expire access after a time that is prescribed in the governing JIT policy.

By contrast, some access control systems use static rules to evaluate elevation requests, and users who make access decisions may have very little information to inform those decisions. Security consciousness and diligence are presumed, but are often not well supported, so an access request might not go through a proper evaluation. The scale at which some access control systems operate can lead to authorization fatigue, which can result in blind approvals and ultimately reduce security, particularly against insider threats.

Some embodiments taught herein evaluate signals and attributes of an elevation request, such as the user, the resource, the resource owner, user patterns, peer patterns, cohort patterns, and so on. Embodiments may then present a machine-learning-based risk score to an authorized approver, who can make an informed decision based on the anomalousness extent of the request. In some embodiments, the decision is used not only to process the request (grant or reject), but also to train the machine learning model, thereby improving the fidelity of risk assessments for future requests.

Embodiment functionality may be included in identity management products or in security infrastructures generally. Embodiment functionality may focus on internal users or on external-facing compliance, or both. Embodiment functionality helps produce informed access authorizations, by arming a decision maker with a relevant anomaly risk score so they know whether to promptly investigate an elevation request. This risk mitigation functionality may augment a rich JIT access control capability, e.g., to help protect against lateral movement and to add significant safety to a cloud platform.

The foregoing examples and scenarios are not comprehensive. Other scenarios, technical challenges, and innovations will be apparent to one of skill upon reading the full disclosure herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, functionality for mitigating cybersecurity risk could be installed on an air gapped network such as a highly secure cloud, and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
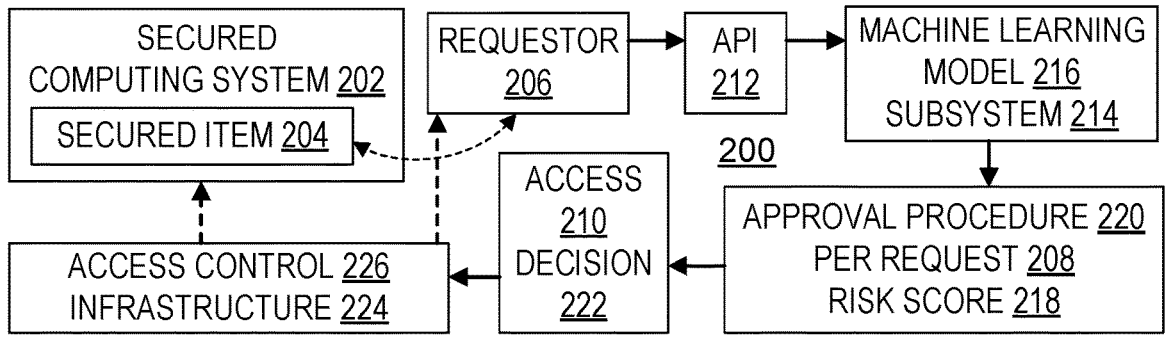
FIG. 2 is a block diagram illustrating aspects of a computing system configured with access request risk mitigation enhancements taught herein.

FIG. 2 illustrates a computing system 200 that has been enhanced according to risk mitigation teachings provided herein. The example system 200 includes all of the subject matter shown in FIG. 2 except a human requestor 206. Other systems 200 omit additional subject matter, e.g., one or more of a request interface 212, a security infrastructure 224, a secured item 204, or a secured system 202 are omitted from system 200 in other variants.

In this example, the secured computing system 202 includes a computing system 102 that is secured by at least one risk mitigation enhancement taught herein. The secured item 204 resides in the secured computing system 202. The requestor 206 submits a request 208 for access 210 to the secured item 204, e.g., by filling in a digital form or sending a digital message to the request submission interface 212, which may include an API 212 or a portal 212, for instance. Data is parsed, copied, or otherwise computationally extracted from the request 208, and sent to a risk scoring subsystem 214 which then utilizes one or more machine learning models 216 to compute an anomaly-based risk score 218. The risk score may quantify, or otherwise represent, risk arising from possible misuse of the secured item 204, e.g., a reputational, financial, legal, or other risk.

A request approval procedure 220 is automatically selected, based at least in part on the risk score 218. In this example, the approval procedure 220 may be one that presents the request to a human approver together with the risk score and gets a decision 222 from the human approver. Alternatively, the selected approval procedure 220 may be one that produces the decision 222 automatically without first presenting the request to a human approver.

The decision 222 is then implemented by the security infrastructure 224, thereby performing access control 226. As indicated by a dashed arrow to the requestor 206, the infrastructure 224 may expressly notify the requestor of the decision. An implicit notification may be given instead, e.g., in the form of a success code or an error code from a file system operation which attempted to read the secured item 204. As indicated by a dashed arrow to the secured system 202, the infrastructure 224 may expressly instruct the secured system to permit the requested access when the request is granted, or the grant instruction may be implicit in the form of an access token provided to the requestor. If the request is denied, in this example no instruction is sent to the secured system because the default status in the absence of contrary authorized instructions is to prevent access.

Notably, the access control 226 in this example is formulated to control access 210 to a given item 204 by a given person 206 at a given time. This formulation contrasts, for example, with the persistent access permissions of a non-JIT access control environment.

Figure 3:
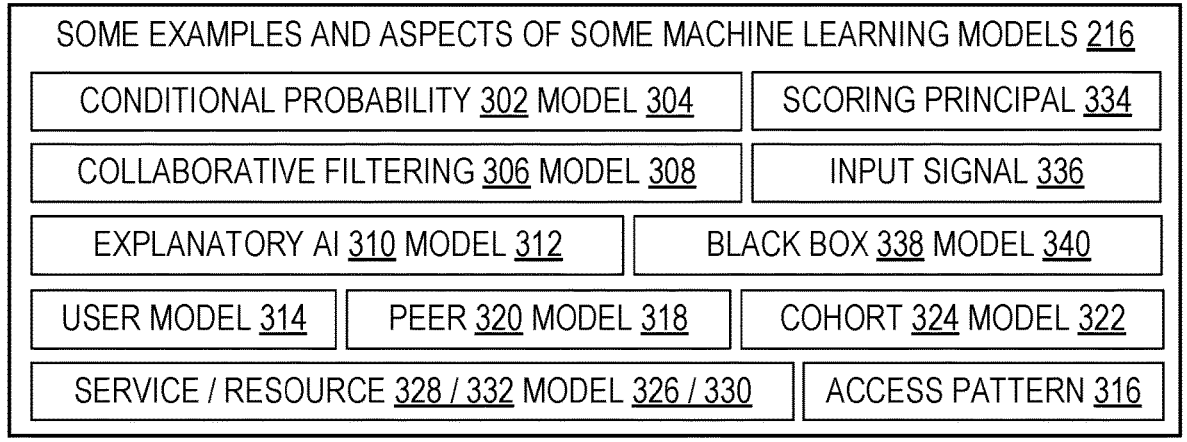
FIG. 3 is a block diagram illustrating some examples and aspects of some machine learning models.

FIG. 3 shows some examples or aspects of some machine learning models 216. This is not meant to be a comprehensive list. These items and other items relevant to access request risk mitigation are discussed at various points herein, and additional details regarding them are provided in the discussion of a List of Reference Numerals later in this disclosure document.

FIG. 4 shows some examples or aspects of some machine learning model subsystems 214. This is not meant to be a comprehensive list. These items and other items relevant to access request risk mitigation are discussed at various points herein, and additional details regarding them are provided in the discussion of a List of Reference Numerals later in this disclosure document.

FIG. 5 shows some aspects of some access request approval procedures 220. This is not meant to be a comprehensive list. These items and other items relevant to access request risk mitigation are discussed at various points herein, and additional details regarding them are provided in the discussion of a List of Reference Numerals later in this disclosure document.

Some embodiments use or provide a functionality-enhanced system, such as system 200 or another system 102 that is enhanced as taught herein. In some embodiments, an enhanced system which is configured to mitigate cybersecurity risk from access requests includes a digital memory 112 and a processor 110 in operable communication with the memory. The enhanced computing system is configured to perform cybersecurity risk mitigation steps including automatically (a) obtaining 606 from a machine learning model subsystem 214 an anomaly-based risk score 218 of a request 208 for access 210 to a secured resource 204 or a secured service 204 or both, (b) selecting 608 an approval procedure 220 based on at least the anomaly-based risk score, (c) submitting 610 the request to the selected approval procedure, (d) getting 612 an access decision 222 from the approval procedure, and (e) implementing 616 the access decision in at least one of the following ways: allowing 740 the requested access, barring 742 the requested access, or deferring 744 access by submitting the request to additional approval processing.

In some embodiments, a system 200 includes the machine learning model subsystem 214, and the machine learning model subsystem includes at least one of the following: a conditional probability 302 machine learning model 304, 216, a collaborative filtering 306 machine learning model 308, 216, or an explanatory artificial intelligence 310 machine learning model 312, 216.

In some embodiments, the request 208 asks that access be granted to a requestor 206, the system 200 includes the machine learning model subsystem 214, and the machine learning model subsystem includes at least one of the following: a user model 314 based at least in part on historical access patterns 316 of the requestor; a peer model 318 based at least in part on historical access patterns 316 of peers 320 of the requestor, each peer 320 being a direct report 404 of a particular manager 402; a cohort model 322 based at least in part on historical access patterns 316 of cohorts 324 of the requestor, each cohort 324 having an equivalent job 406 responsibility 408 access level 410; a service model 326 based at least in part on historical access patterns 316 of access to the secured service 328, 204; or a resource model 330 based at least in part on historical access patterns 316 of access to the secured resource 332, 204.

In some embodiments, the system 200 includes the machine learning model subsystem 214, and the machine learning model subsystem utilizes 738 at least one of the following as a scoring principle 334: a probability 412 that a given attribute 414 will appear in the request; an entropy 416 measure of uncertainty in a distribution 418 of access requests; or a count 420 of prior access requests which have a given attribute 414.

In some embodiments, the system 200 includes the machine learning model subsystem 214, and the system utilizes at least two of the following as an input signal 336 to a machine learning model of the machine learning model subsystem or as a scoring condition 422, or both: a channel identification 426 which uniquely identifies a channel 424 that carried the request; a channel category 428 of a channel 424 that carried the request; a domain identification 432 which uniquely identifies a source domain 430 of the request; a domain category 434 of a source domain 430 of the request; a subnet identification 438 which uniquely identifies a source subnet 436 of the request; a subnet category 440 of a source subnet 436 of the request; an IP address 442 which uniquely identifies a source of the request; an IP address category 444 of a source of the request; a resource identification 446 which uniquely identifies the secured resource 332, 204; a resource category 448 of the secured resource 332, 204; a request resource count 450 which indicates a number of resources 332 the requestor seeks to access through the request; a request resource level 452 which indicates a resource access level 410 the requestor seeks through the request; a personnel identification 454 which uniquely identifies the requestor; a personnel category 456 of the requestor; a service identification 458 which uniquely identifies a service 328 that contains the secured resource 332 or is otherwise secured; a service category 460 of a service that contains the secured resource 332 or is otherwise secured; a requestor risk score 462; a resource risk score 464; or a service risk score 466.

In general, a system 200 is configured to perform cybersecurity risk mitigation steps. A "cybersecurity risk" includes, e.g., risk to data confidentiality, data integrity, data availability, privacy, or compliance with regulations or policy.

As noted elsewhere herein, digital memory 112 may be volatile or nonvolatile, or a mix.

Other system embodiments are also described herein, either directly or derivable as system versions of described processes or configured media, duly informed by the extensive discussion herein of computing hardware.

Although specific risk mitigation architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different security controls, technical features, mechanisms, access controls, operational sequences, data structures, data correlations, or other functionalities for instance, and may otherwise depart from the examples provided herein.

Processes (a.k.a. Methods)

Figure 6:
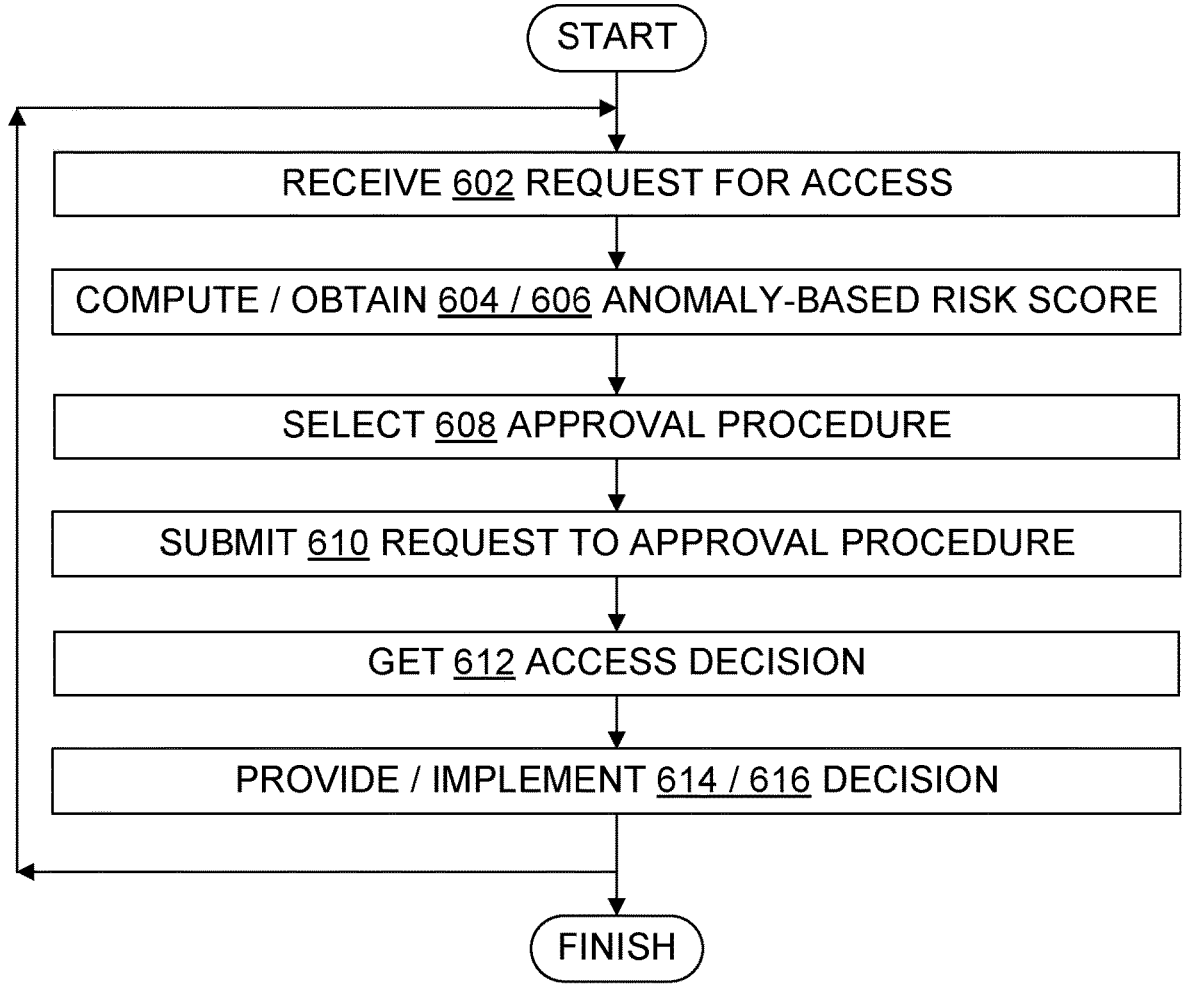
FIG. 6 is a flowchart illustrating steps in some methods for mitigating cybersecurity risk arising from access requests.
Figure 7:
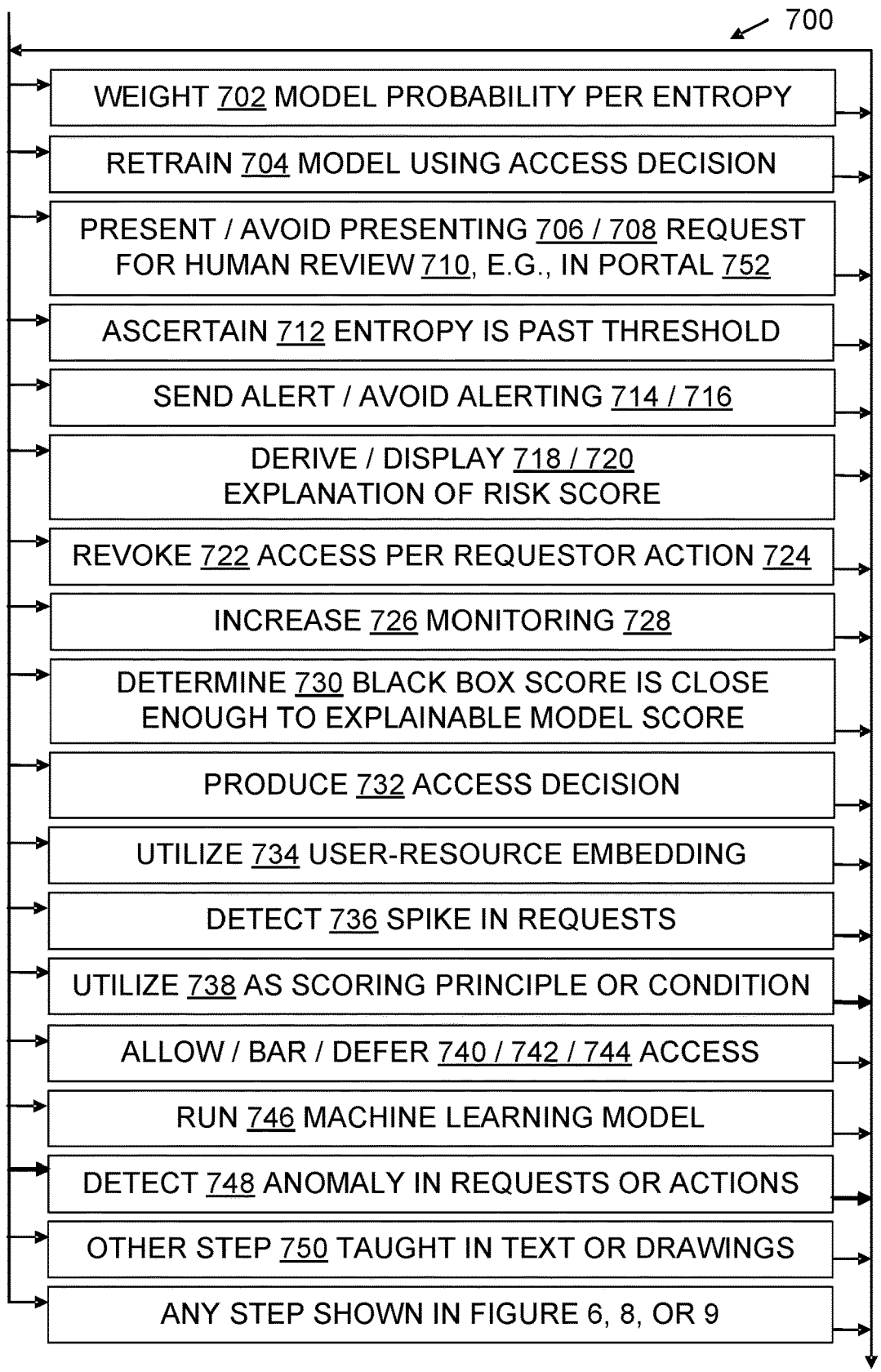
FIG. 7 is a flowchart further illustrating steps in some methods for mitigating cybersecurity risk from access requests.
Figure 8:
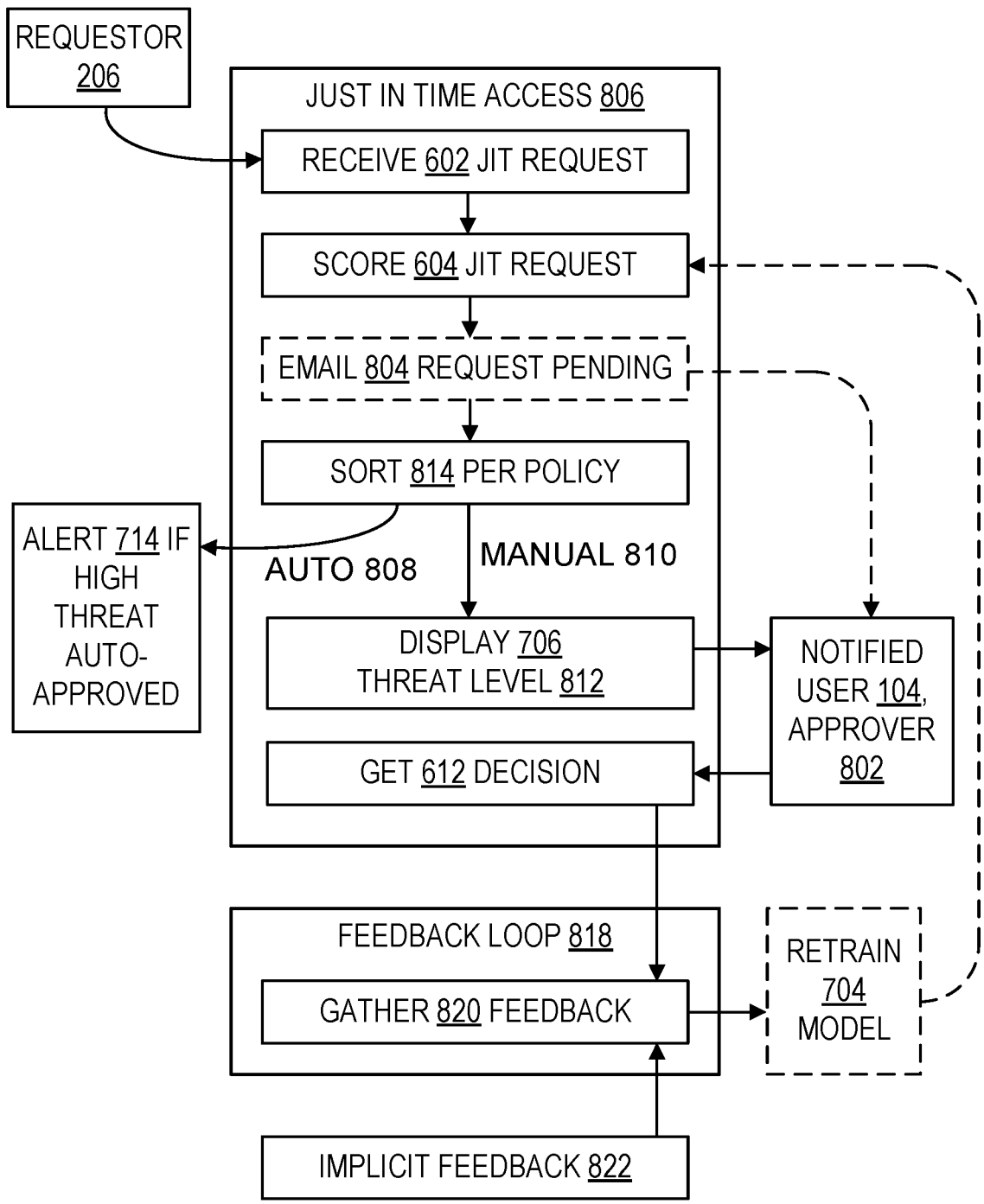
FIG. 8 is a diagram illustrating an access request workflow.
Figure 9:
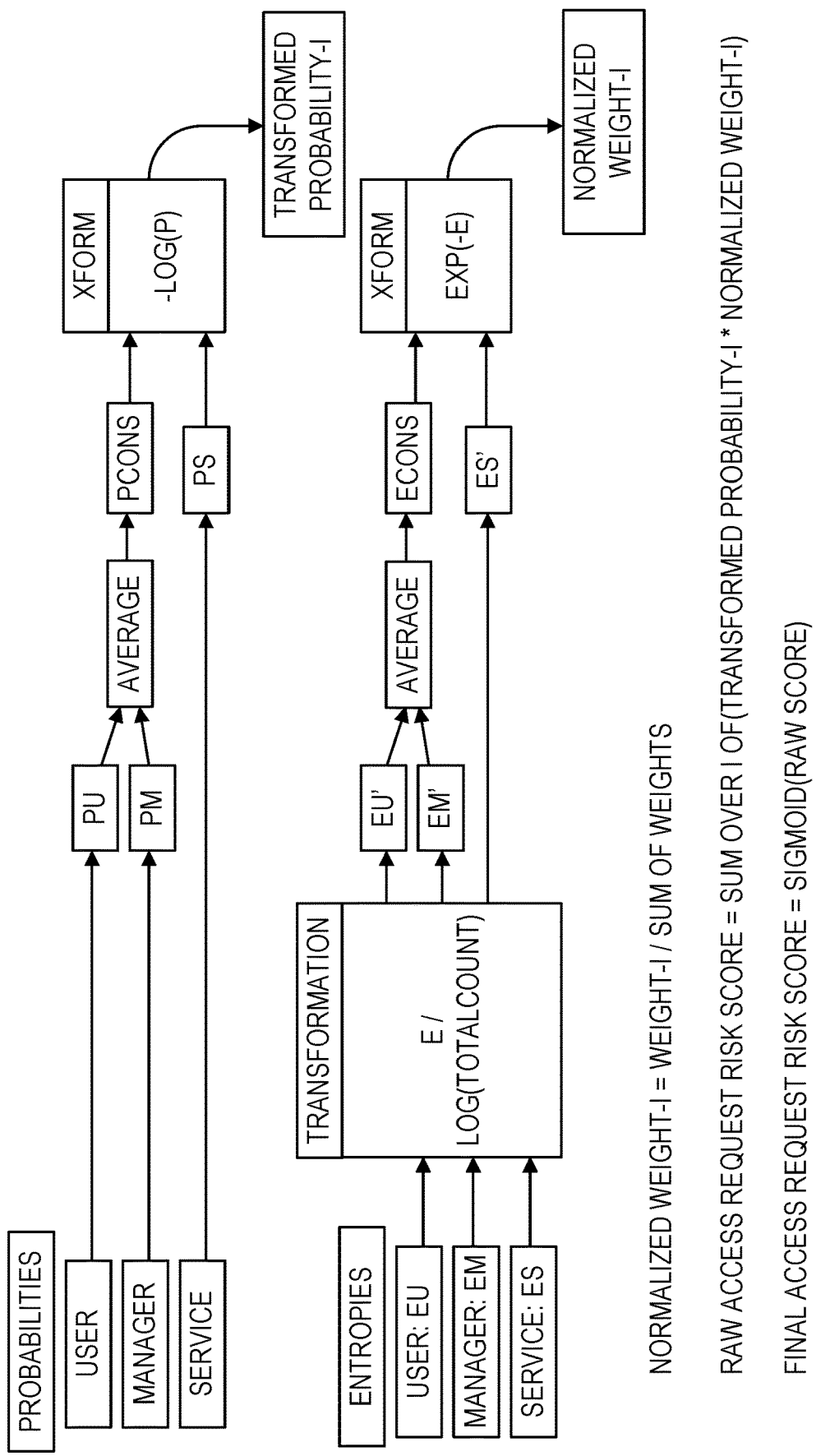
FIG. 9 is a diagram illustrating a machine learning model subsystem calculation of an access request risk score.

FIGS. 6 and 8 illustrate method families 600, 800 that may be performed or assisted by an enhanced system, such as system 200 or another risk mitigation functionality enhanced system as taught herein. FIG. 9 illustrates a computational method to compute 604 an access request risk score 218. FIG. 7 further illustrates risk mitigation methods (which may also be referred to as "processes" in the legal sense of that word) that are suitable for use during operation of a system which has innovative functionality taught herein. FIG. 7 includes some refinements, supplements, or contextual actions for steps shown in FIGS. 6 and 8. FIG. 7 also incorporates steps shown in FIG. 6, 8, or 9.

Technical processes shown in the Figures or otherwise disclosed will be performed automatically, e.g., by an enhanced security infrastructure, unless otherwise indicated. Some related processes may also be performed in part automatically and in part manually to the extent action by a human person is implicated, e.g., a human requestor 206 may create a request using an API 212 and a human approver 802 may render a decision 222 using the API 212, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom (or left-to-right) order that is laid out in FIGS. 6 through 9. Steps may be performed serially, in a partially overlapping manner, or fully in parallel. In particular, the order in which action items of FIGS. 6 through 9 are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for mitigating cybersecurity risk from access requests, including the following steps: receiving 602 a request for access to a secured resource or a secured service or both; computing 604 an anomaly-based risk score of the request, the anomaly-based risk score being computed based on at least a weighted combination of historical access pattern models; selecting 608 an approval procedure based on at least the anomaly-based risk score; submitting 610 the request to the selected approval procedure; getting 612 an access decision from the approval procedure; and providing 614 the access decision to an access control infrastructure which is configured to implement the access decision.

In some embodiments, the selecting 608 selects at least one of the following approval procedures based on at least the anomaly-based risk score: a step-up approval procedure 502, 220 which includes presentation 706 of the request for human review 710; or a step-down approval procedure 504 which avoids 708 presentation of the request for human review 710.

In some embodiments, each historical access pattern model 216 has an associated predicted probability 412 and also has an associated measure of distribution entropy 416, and computing 604 the anomaly-based risk score 218 includes weighting 702 the predicted probability of each model according to the entropy measure of that model.

Some embodiments include displaying 720 an explanation 468 of the computed anomaly-based risk score. The explanation is automatically derived 718 from a comparison of the request to at least one historical access pattern. The score itself is not necessarily displayed. Several example explanations 468 are shown below.

Example Scoring Explanation A. "This request is an anomalous JIT request to a resource owned by your service. This could possibly indicate that the JIT request is from a compromised account, or that an attacker is trying to compromise a resource owned by your service. The request is considered anomalous because during 52 observations during the last 6 months, requests with attribute User=useralias have 0% probability of the field OwningServiceContext containing the value ServiceName1, whereas a typical value for that field is ServiceName2."

Example Scoring Explanation B. "This request is considered anomalous because during 284 observations during the last 6 months, requests with Manager=BestBoss have 0% probability of field OwningServiceContext containing the value ServiceName1, whereas a typical value for that field is ServiceName2 or ServiceName3."

Example Scoring Explanation C. "Threat Assessment Details for request abcdefgh-12345678. This JIT request was identified as anomalous for the following reason(s): In the last 6 months, request source foobar made 20 JIT request(s) to the following resource type(s) using the following channel(s):

Resource Type(s):
  XYZResourcePortal (100.0%)
Channel(s):
  JIT_RestAPI (100.0%)
This JIT request was deemed anomalous because it was for access to a different resource type and was made using a different channel:
Resource Type: XYZResourceElevated
Channel: JIT UI
For support or with any questions, please contact the Threat Detection Team threatdetect at contoso dot com."

In some embodiments, the anomaly-based risk score 218 is computed 604 at least in part using a machine learning model, and the method further includes retraining 704 the machine learning model using at least the access decision 222.

In some embodiments, the method computes 604 the anomaly-based risk score 218 as an explainable risk score using an explainable machine learning model 312; the method further computes 604 a black box risk score 218 using a black box 338 machine learning model 340; and the method includes determining 730 that the black box risk score is within a predetermined tolerance 470 of the anomaly-based risk score, and then displaying 720 an explanation 468 of at least one risk, the explanation being automatically derived 718 from at least one of the following: an input 336 to the explainable machine learning model, or an output (explainable risk score or explanation thereof) of the explainable machine learning model.

In some embodiments, the method includes ascertaining 712 that the request has an entropy 416 above a specified threshold 472, and then selecting 608 an approval procedure which avoids 716 alerting on the request.

In some embodiments, the request asks that access be granted to the requestor, and the method further includes at least one of the following: automatically revoking 722 access by the requestor in response to an action 724 taken by the requestor after the access decision granted 740 the request; automatically increasing 726 security monitoring 728 of the requestor 206 in response to an action 724 taken by the requestor after the access decision granted 740 the request; or automatically increasing 726 security monitoring 728 of the secured resource or the secured service or both in response to an action 724 taken by the requestor after the access decision granted the request.

In particular, anomaly detection processing herein may go beyond explicit requests submitted to a JIT request interface 212, such as requests for a JIT elevation of privilege. Actions 724 which do not require additional privileges may nonetheless be anomalous. For instance, access may be revoked 722 or monitoring may be increased 726 in response to automatic detection of anomalous actions 724 such as deleting, renaming, copying, moving, encrypting, compressing, or transmitting (email, file transfer, download, etc.) unusually large numbers of items or unusually large amounts of data, or anomalous actions 724 by which many items that are not typically accessed by a given user are accessed. Any anomalous action 724 after a JIT request 208 is granted may trigger increased security measures.

In some embodiments, the selected approval procedure produces 732 the access decision based on at least a rule 506 or a policy 508 which is defined without reference to the anomaly-based risk score.

In some embodiments, the method computes 604 the anomaly-based risk score utilizing 734 a user-resource embedding 474 to model for anomalous access.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as machine learning models 216, machine learning model subsystems 214, request data structures 208, decision data structures 222, risk scores 218, 462, 464, 466, score tolerances 470, scoring explanation data structures 468, model signals 336, scoring principals 334, 416, 412, 420, access pattern data 316, or software fully or partially implementing flows shown in one or more of FIGS. 6 through 9, in the form of data 118 and instructions 116, read from a removable storage medium 114 and/or another source such as a network connection, to form a configured storage medium. The configured storage medium 112 is capable of causing a computer system 102 to perform technical process steps for mitigating risk associated with access requests 208, as disclosed herein. The Figures thus help illustrate configured storage media embodiments and process (a.k.a. method) embodiments, as well as system and process embodiments. In particular, any of the process steps illustrated in FIGS. 6 through 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a cloud or other computing system to perform a method for mitigating cybersecurity risk from access requests. This method includes: receiving 602 a request for access to a secured resource or a secured service or both; computing 604 an anomaly-based risk score of the request, the anomaly-based risk score being computed in a machine learning model subsystem using at least one machine learning model; selecting 608 an approval procedure based on at least the anomaly-based risk score; submitting 610 the request to the selected approval procedure; getting 612 an access decision from the approval procedure; and providing 614 the access decision to an access control infrastructure which is configured to implement the access decision.

In some embodiments, the method includes sending 714 an alert 478 toward a stakeholder 510 in response to an anomalous access request.

In some embodiments, the request asks that access be granted to a requestor, and the method includes detecting 736 a spike 476 in requests from the requestor.

In some embodiments, the method utilizes at least N of previously discussed herein items 426, 428, 432, 434, 438, 440, 442, 444, 446, 448, 450, 452, 454, 456, 458, 460, 462, 464, 466 as a machine learning model input signal or as a scoring condition, or both. N may be any value in the range from 1 to 19, depending on the embodiment.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered in the following sections.

JIT Access Workflow

FIG. 8 shows an overview of an example JIT access workflow. Some embodiments that support JIT access 806 alert security responders to anomalous elevation requests, which helps identify potential malicious insider threats. In some embodiments, elevated access requests 208 are subject to additional authorization via manual approval 810. A threat level (e.g., high or low) based on an anomaly score 218 is presented 706 to an elevation request reviewer 802, e.g., in a JIT portal 212 or an email 804. The reviewer uses this threat level 812 to assess the security risk in approving the request. This presentation 706 improves security.

In some embodiments, requests 208 may be computationally sorted 814 according to rules 506 or policies 508 or both, into a first set of requests for which approval may be granted automatically and a second set of requests which can be granted only by a human reviewer. Some elevated access requests 208 are thus set for automatic approval 808 if specified conditions are met satisfying rules 506 or policies 508 or both. Despite this, a high threat level based on an anomaly score may compel additional authorization processing, e.g., a manual review process 810. This is an example of step-up authorization 502, which helps ensure extra scrutiny is applied to high-risk requests for elevated access that would otherwise be auto-approved. This step-up authorization 502 improves security.

Some embodiments provide step-down authorization 504 for elevated access requests 208 that are subject to additional authorization such as human review under the applicable rules 506 or policies 508 or both. A request which has a low threat level based on anomaly scoring may bypass human review and instead be granted automatic approval. Additional conditions may be prescribed, e.g., a requestor's personal risk score 462 may also need to be low. This step-down authorization 504 improves developer productivity.

Some embodiments facilitate scrutiny of access policies that grant access to resources. Alerts generated by a step-up authorization procedure 502 or a step-down authorization procedure 504 help surface and highlight risky policy configurations and configuration patterns, so that services will employ access control practices that iteratively tighten the security posture, e.g., by separating access review from development (separation of duties), by separating low-impact access requests from high-impact requests for elevated access, by reducing who 206 may request access, and by reducing a scope of what items 204 they may access. This scrutiny improves security as well as DevOps productivity. Moreover, risk assessment of elevated access approvers 802, 220 is also facilitated. Surfacing risky elevation approvals and approval patterns helps ensure that services and human approvers employ discipline in processing access requests. This improves security.

In some embodiments, a feedback loop 818 provides threat assessment feedback. Decisions 222 and possibly other data such as implicit feedback 822 are gathered 820 into a feedback data set which is used to retrain 704 one or more components of the machine learning model subsystem 214.

Tools and technologies such as PySpark™ (mark of Apache Software Foundation), Azure App Insight™, Azure Cosmos DB®, and Kusto™ offerings (marks of Microsoft Corporation), blob storage services, incident management services, and their functionally similar counterparts may be utilized.

Some embodiments utilize supervised learning, with labelled data based on user feedback. Some utilize a requestor risk score 462, peer risk score, cohort risk score, or other value that is derived from user security metadata.

Machine Learning Subsystem, Models, and Algorithms

FIG. 9 shows details of an example machine learning model subsystem 214 that employs conditional probability 302 machine learning models 304, 216. More generally, some embodiments employ Conditional Probability (CP) algorithms to calculate the probability 412 of an event based on prior behavior. Some calculate the probability score of an engineer's request to access a resource by comparing historical access patterns 316 over a 6-month period; other embodiments use different periods, e.g., N months where N is in the range from 1 to 12.

Some embodiments use two or more different CP models 304. For instance, some employ a user model 314 based on the requesting engineer's historical access patterns. Such a model may use one or more of the following historical user attributes 414, for example:

How often is the user requesting access to a specific service 328?

How often is the user requesting access to a specific resource 332?

How often is the user requesting access using the JIT elevation portal UI or API?

How often is the user requesting access from a specific security domain 430?

How often is the user requesting access from a specific IP address 442?

How often is the user requesting a specific access level 410 to a given resource?

How often is the user requesting access from a specific geographic location?

Some embodiments employ one or more of the following conditional probability user models 304, 314, which are listed here according to the attribute pairs employed: (requestor alias, domain), (requestor alias, channel), (requestor alias, resource type), (requestor alias, owning service). User models may also be referred to as "requestor models".

Some embodiments employ a peer model 318 based on the historical access patterns of the requesting engineer's peers 320. This model may be particularly useful when a requestor's historical information is insufficient. Such a model may use one or more of the following historical user attributes, for example:

How often are the user's peers requesting access to a specific service?

How often are the user's peers requesting access to a specific resource?

How often are the user's peers requesting access using the JIT elevation portal UI or API?

How often are the user's peers requesting access from a specific security domain?

In some embodiments, for each requestor model an associate peers model (a.k.a. "peer model") is generated. The peers model combines samples for all employees under the same manager, implementing an assumption that employees in same team share JIT habits. Upon encountering a low number of samples or low confidence in a requestor model, the subsystem 214 may use a peers model for anomaly scoring.

Some embodiments employ one or more of the following conditional probability peers models 304, 318, which are listed here according to the attribute pairs employed: (manager alias, domain), (manager alias, channel), (manager alias, resource type), (manager alias, owning service).

One of skill will acknowledge that a cohort model 322 may be defined similarly to a peer model, by using cohorts 324 of a requesting user 206 rather than the user's peers 320.

Some embodiments employ a service model 326 based on the historical access patterns for a specific service 328. Such a model may use one or more of the following historical attributes, for example:

How often are the service or its resource(s) being accessed by an employee of the organization that owns the service as opposed to being accessed by a vendor or partner or other non-employee?

How often are the service or its resource(s) being accessed from a specific security domain?

Some embodiments employ one or more of the following conditional probability service models 304, 326, which are listed here according to the attribute pairs employed: (owning service, employee type), (owning service, domain).

One of skill will acknowledge that a resource model 330 may be defined similarly, by using a resource 332 rather than a service 328.

As further illustration of models 216 generally, some examples of JIT Attributes and respective values that may serve as input signals 336 include Requestor Alias (e.g., username), ServiceName (e.g., DevPipelines, EnterpriseApps, DBSecurity), ResourceType (e.g., XYZResourceNode, XYZResourcePortal), Resource Count (e.g., 1, 2, 12), Channel (e.g., JITRestAPI, JITUI), RequestedAccess (e.g., LocalAdmin, Admin, PlatformServiceOperator), OnCall (true/false), Masked16ClientIP (e.g., 157.58.X.X), Domain (e.g., USSOUTH, ASIA1), WorkItem State (e.g., active, unknown, resolved), Employee Type (e.g., vendor, FTE).

In general, conditional probability calculates the probability of an event given prior knowledge. In some embodiments, this includes two phases. During a training phase, historical data is used to train the models 304. During a scoring phase, the trained models 304 are used to predict the probability of an event, and those outputs are used by the scoring subsystem 214 to compute an risk score 218 for a given access request 208.

One of skill will acknowledge that a conditional probability model may include or utilize a probability table. Probability is calculated as P(B|A), where A is a condition and B is a feature. This may be interpreted as the probability that B will occur given that A has already occurred. During scoring of a JIT request, attributes of the request may be compared to matching entries in the probability tables.

A low confidence in a prediction may result from a low number of samples. To quantify confidence (a.k.a. "uncertainty"), some embodiments calculate a Shannon Entropy measurement. In one formulation, Shannon Entropy H is minus one times the sum over values of j of $p_j * \log_b(p_j)$, where $p_j$ is the probability of the jth event, and j ranges from 1 to the number of observed events. A high entropy, e.g., above 8.0 or another defined threshold, indicates low confidence (high uncertainty). A low entropy, e.g., below 0.2 or another defined threshold, indicates high confidence (low uncertainty). Some embodiments do not alert on JIT requests which have high entropy (low confidence), event when the risk score 218 would otherwise cause an alert.

In some embodiments, a machine learning algorithm is implemented using one or more of the following scoring principles 334.

Probability 412. A conditional probability model predicts the probability for a given attribute to appear in a JIT request. Probability is an output value that the model returns. Low probability means that based on the conditional probability prediction model, there is a low probability for a user to perform a JIT request with attributes reflected by the model, i.e., the request is more suspicious. Hence, lower probability from trained model implies more suspiciousness, therefore yielding a high anomaly score.

Entropy 416. Entropy measures the predictability (e.g., surprises, uncertainty) in a distribution 418. Suppose a user A has been accessing multiple resources uniformly. User A will have higher entropy than a user B who has been accessing a single resource Res1 90% of the time and a few other resources in the remaining 10%. Accordingly, the model does not have much information about A to predict the next access, whereas it is likely that B will be accessing Res1 again. Therefore, entropy provides confidence in a distribution. An embodiment subsystem 214 may use the degree of confidence to decide how much a specific model will contribute to the final risk score. Higher entropy will result in a model contributing less to the final risk score 218.

Count 420. A count quantifies past evidence. As with entropy, a subsystem 214 may use count to determine how much confidence resides with a specific model. Higher confidence models will contribute more to the final score. For example, if a specific model predicted the same probability for JIT request A and JIT request B, but for A there are 1000 pieces of past evidence and for B there is only 1 piece of past evidence, subsystem 214 has more confidence in the anomalousness of A than in the anomalousness of B. A higher count will add more confidence to the anomaly score.

Model Weight 480. Attributes within a JIT request may have different relative importance in respect to identifying anomalies. For instance, an anomaly that was identified based on the service that a user JITed to may be more critical than an anomaly that was identified based on the channel the user used to perform the JIT request. Therefore, in some embodiments models do not equally contribute to the final anomalous score 218. To achieve this, each type of model is given a weight 480 that determines how much it will contribute to the final score. A model that has higher weight will contribute more to the final anomalousness score 218.

A score aggregation algorithm combines all the information coming from the different models and calculates the final threat score. In some embodiments the threat score 218 is a function of weights 480, probabilities 412, entropy measures 416, and counts 420 for respective models 304. Models 216 other than conditional probability models may also be weighted, e.g., per count or entropy or both, and models 216 of various kinds 304, 308, 312, 340 may be combined in a subsystem 214.

FIG. 9 illustrates one score aggregation algorithm, but others may also be used in various ML model subsystems 214. The FIG. 9 example uses geometric mean as the average, but some other embodiments use a harmonic mean, or an arithmetic mean.

In some embodiments, a subsystem 214 considers one or more of the following scoring conditions 422 in addition to reflecting the machine learning model signals 336: Termination date of employee (JIT requests done by employees that just terminated or are about to terminate—which defines a category 456—have a higher threat score), Requestor risk score 462 (users that have access to sensitive resources have a higher risk score, so any anomaly identified for those users should increase), Service risk score 466 (an anomalous JIT request to a resource within a sensitive service should increase the threat score).

With regard to model performance evaluation and improvement based on a user feedback loop 818, some embodiments collect 820 feedback from approvers. The feedback may be used to measure the performance of the ML algorithm, or be used to generate labels to build a supervised ML algorithm to improve the performance, or both. Some embodiments implement adaptive learners based on feedback. Some use feedback to generate rewards to train agents in reinforcement learning environments in an online setup. Supervised learning may employ logistic regression, decision trees, random forests, or gradient boosting, for example. Feedback for tuning the subsystem 214 may manifest a precision-recall curve to evaluate decision thresholding.

With regard to explainable artificial intelligence (AI) 310, some embodiments include, or a limited to, explanatory models 312. One of skill will acknowledge that explainable AI technology seeks to provide an explanation of why an ML algorithm arrives at a particular decision, with the explanation being understood by the humans who rely on or ratify the decision. This is important for security investigators, so that they have the information on why a specific access request is deemed risky. One advantage a Conditional Probability model is that supports explainable AI. This contrasts with black box models for which it is difficult to explain why the black box model arrived at a particular decision. Some embodiments include a reusable framework in which the results of conditional probability models are translated into a natural language that can be easily comprehended by humans. This explanation 468 is presented to the approver or security investigator along with the risk score.

Some embodiments find 736 spikes 476 in access request volume using a time series model 216. Some detect bursts and low-n-slow activity.

Some subsystem 214 embodiments implement a supervised classifier together with the unsupervised models to generate a final anomaly score. An unsupervised model may find novel anomalies which a supervised model overlooks.

Some embodiments use 734 user-resource embeddings 474 to model for anomalous access, instead of a conditional probability model. Some use collaborative filtering or deep neural networks to find embeddings 474. This approach may reduce effort spent finding tuning weights to aggregate ensemble multiple conditional probability models, and may allow omission of the manager models 318, as the embedding will capture the clusters as well for both users and resources.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as running 746 a machine learning model, computing 604 a risk score, calculating values for entropy 416, probability 412, and observance count 420, retraining 704 a machine learning model, barring 742 access to secured digital items 204, and monitoring 728 actions in a computing system 200, which are each an activity deeply rooted in computing technology. Some of the technical mechanisms discussed include, e.g., machine learning models 216, 304, 308, 312, 340, 314, 318, 322, 326, 330, computational subsystems 214 that combine outputs from multiple machine learning models, automated approval procedures 220, and security infrastructures 224. Some of the technical effects discussed include, e.g., automatic access request anomaly detection 748 based on historical access patterns 316, automatic approval 740 of low risk access requests, compelled human review 710 of high risk requests, human-understandable explanations 468 of detected anomalies, continued monitoring 728 and potential access revocation 722 after access is granted, and continually improved fidelity of anomaly detection via model retraining 704. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as confidentiality, data integrity, efficiency, privacy, speed, or trust may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively detect and mitigate risks from access requests. Other configured storage media, systems, and processes involving confidentiality, data integrity, efficiency, privacy, speed, or trust are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP(S): hypertext transfer protocol (secure)
IaaS or IAAS: infrastructure-as-a-service
ID: identification or identity IoT: Internet of Things
IP: internet protocol
LAN: local area network
OS: operating system
PaaS or PAAS: platform-as-a-service
RAM: random access memory
ROM: read only memory
SIEM: security information and event management; also refers to tools which provide security information and event management
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
USB: universal serial bus
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, "risk" refers to a potential for loss or harm. "Risk" may also be defined as a likelihood of loss or harm multiplied by the impact if the loss or harm actually occurs.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Risk "mitigation" means, e.g., performing one or more of the following in conjunction with, or as a precondition of, or in response to, a request or other attempt to access an asset or other resource: alerting, altering, auditing, authenticating, authorizing, blocking, delaying, invoking a security control, limiting, managing, moving, logging, reconfiguring, reporting, restricting, securing, or another operation taught herein. Mitigation is performed computationally, e.g., not by operation of law or by persuasive oratory.

"Misuse" of an asset or other resource includes any improper or unauthorized use, including in particular any uses that violate the confidentiality, integrity, availability, or privacy of data.

"Secured" means only that some security is provided, not that the effectiveness of the security is guaranteed.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Risk mitigation operations such as running 746 machine learning models, computing 604 risk scores, barring 742 access to digital items 204, and many other operations discussed herein, are understood to be inherently digital. A human mind cannot interface directly with a CPU or other processor, or with RAM or other digital storage, to read and write the necessary data to perform the risk mitigation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, allowing, ascertaining, barring, computing, deferring, deriving, detecting, determining, displaying, getting, implementing, monitoring, obtaining, presenting, processing, producing, providing, receiving, revoking, running, selecting, sending, submitting, retraining, utilizing, weighting (and accesses, accessed, allows, allowed, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as a "computational system" or "computing system", and when in a network may be referred to as a "node"
- 104 users, e.g., user of an enhanced system 200
- 106 peripherals
- 108 network generally, including, e.g., LANs, WANs, software-defined networks, clouds, and other wired or wireless networks
- 110 processor
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
- 124 applications, e.g., word processors, web browsers, spreadsheets, games, email tools, commands
- 126 display screens, also referred to as "displays"
- 128 computing hardware not otherwise associated with a reference number 106, 108, 110,
- 200 computing system 102 enhanced with risk mitigation functionality taught herein, e.g., with one or more of a subsystem 214, procedure 502, procedure 504, functionality according to any of FIGS. 6 through 9, or any other functionality first taught herein
- 202 computing system which contains a secured item 204
- 204 secured item, e.g., a resource or service secured against misuse
- 206 requestor, e.g., a person or service that requests access 210
- 208 access request; a data structure or other digital artifact
- 210 access to an item, e.g., to read, write, move, encrypt, decrypt, compress, decompress, or otherwise perform computational action on or using
- 212 API, portal, or other computational interface for receiving access requests; may also display requests to approvers
- 214 computational subsystem
- 216 machine learning model
- 218 access request risk score; may be numeric or categorical (e.g., low, medium, high)
- 220 approval procedure; performs computations; despite the name, may either approve or deny a given access request; may include displaying formation to a human for review and receiving computationally data entered by the human
- 222 decision in response to access request; data structure
- 224 access control infrastructure, e.g., security controls and tools
- 226 access control
- 302 conditional probability
- 304 conditional probability machine learning model; computational
- 306 collaborative filtering; technology for making automatic predictions (filtering) about the interests of a user or the anomalousness of an event by collecting preferences or taste information from many users or about many events
- 308 collaborative filtering machine learning model; computational
- 310 explanatory AI; explanatory machine learning
- 312 explanatory AI model; explanatory machine learning model; computational
- 314 user machine learning model; computational
- 316 access pattern or other action pattern; digital data
- 318 peer (or "peers") machine learning model; computational
- 320 peer
- 322 cohort machine learning model; computational
- 324 cohort
- 326 service machine learning model; computational
- 328 service in a computing environment; computational
- 330 resource machine learning model; computational
- 332 resource in a computing environment; data structure, storage, bandwidth, processor, other hardware or software artifact
- 334 scoring principal in a subsystem 214; scoring principals are implemented computationally; although both scoring principles and input signals may be used by a subsystem 214, a distinction may be made between them, in that scoring principles include different properties calculated from models and used as input to a subsystem's scoring function, while signals 336 are used to build different models; a scoring principle may impact a risk score, e.g., in that low probability, high count and low entropy coming from a model will eventually reduce the anomalousness score
- 336 input signal to a machine learning model; digital data; an embodiment may use a signal to define specific attributes within the JIT request which it will use and check in order to decide if a request is anomalous, this could be an explicit attribute such as the service the user is JITing to or an implicit attribute such as a requestor risk score; signals may be used to build different models 216, e.g., a model could be built from a signal that is the IP address from which a user performed the JIT request, and another model could be built for another signal such as whether the user is full time employee or vendor; see also scoring principal 334 entry above 338 black box; computational component whose output is not accompanied by or easily correlated with (e.g., via a formula or lookup table), an explanation of said output 340 black box machine learning model; computational 402 manager, boss, supervisor, etc.

404 direct report, e.g., a person who reports directly to a manager as opposed to reporting indirectly through the manager to the manager's boss; may be determined by reference to an organizational chart or job description 406 job, role, position in an organization; for example, DevOps support with limited scope, engineer, customer support person; people may have similar roles without necessarily being peers because peers all report to the same manager, whereas cohorts are based on similar responsibility and do not necessarily all have the same manager 408 responsibility associated with a job; some examples of job responsibilities that are not similar are: an engineer performing deployment activities based on elevated permissions, a customer support person looking at system metadata to diagnose a problem without elevated permissions, a tier-3 engineer utilizing elevated superuser permissions to fix a customer-impacting issue 410 access level, e.g., in terms of a task to be done 412 probability; may be numeric or categorical (e.g., low, medium, high); digital 414 attribute; implemented as digital data 416 entropy; implemented as digital data 418 distribution, e.g., of access requests; digital data 420 count of requests or other events; digital data 422 scoring condition; implemented computationally 424 digital communication channel 426 channel identification; digital data 428 channel category; digital data 430 digital security domain 432 domain identification; digital data 434 domain category; digital data 436 digital network subnet 438 subnet identification; digital data 440 subnet category; digital data 442 IP address 444 IP address category 446 digital resource identification; digital data 448 digital resource category; digital data 450 count of resources request seeks access to; digital data 452 access level 410 sought by request 454 identification of a person; digital data 456 category to which a person belongs, e.g., current employee, former employee, employee scheduled for termination; digital data 458 identification of a service, e.g., name or number; digital data 460 category to which a service belongs 462 requestor risk score 464 resource risk score 466 service risk score 468 human-understandable explanation of a score; data structure containing text or audio or video 470 tolerance between scores from different kinds of models 216

472 entropy threshold; digital value 474 user-resource embedding in a neural network; computational 476 spike in values, e.g., as determined by a default or admin-selected statistical measure 478 alert data structure or digital message 480 weight applied computationally to a model 216 output 502 step-up approval procedure—compels human review 504 step-down approval procedure—avoids human review 506 access rules; implemented computationally 508 access policies; implemented computationally 510 stakeholder, e.g., requestor, approver, or another person who may be impacted by a decision 222

600 flowchart; 600 also refers to risk mitigation methods illustrated by or consistent with the FIG. 6 flowchart 602 computationally receive a request 208

604 compute (in a system 102) a risk score 218

606 computationally obtain in a system 102 a risk score 218 that was previously computed in the system or outside the system 608 computationally select an approval procedure, e.g., based on rules or policies, and based on the risk score 218

610 computationally submit a request to an approval procedure 612 computationally get a decision 222 from the approval procedure 614 computationally provide a decision 222 to a security infrastructure 224

616 computationally implement a decision 222, e.g., by allowing access or barring access; a security infrastructure 224 may also computationally mitigate risk, e.g., by (a) reporting an apparent attack in a text message, email, generated-voice message, printout, alert, screen display, or other communication to an administrator or to security personnel or both, (b) triggering defense, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction, (c) imposing an access restriction, (d) locking an account, (e) blocking a location, e.g., an IP address or device or geolocation, (f) requiring additional authentication before permitting access, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate, or (g) taking any other computational action identified herein as a risk mitigation 700 flowchart; 700 also refers to risk mitigation methods illustrated by or consistent with the FIG. 7 flowchart (which incorporates the steps of FIGS. 6, 8, and 9)

702 computationally aggregate weighted model outputs 704 computationally retrain a model 216

706 computationally present at least part of an access request to a human reviewer, e.g., by displaying it on a display 126

708 computationally avoid presenting at least part of an access request to a human reviewer, e.g., by automatically deciding 222 the request 710 human review (provides context for some computational steps); may be viewed as a sort of "friction" in an approval workflow, to be increased or decreased, e.g., by selecting step-up or step-down approval procedures 712 computationally ascertain that entropy is past a threshold
714 computationally send an alert 478
716 computationally avoid sending an alert 478, e.g., by providing 614 or implementing 616 a decision 222 without sending the alert
718 computationally derive an explanation 468, e.g., by filling in a template with digital values (several examples are discussed herein)
720 computationally display an explanation 468, e.g., on a display 126
722 computationally revoke access, e.g., by invalidating a token, returning file system error codes, or decreasing access level
724 action generally in a computing system 102
726 computationally increase monitoring 728
728 computationally monitor activity 724, e.g., by logging, auditing, copying to a SIEM or other security tool, and possibly alerting
730 computationally determine two scores or other model 216 outputs are within a tolerance of each other
732 computationally produce an access decision 222, e.g., by auto-approval or based on human input
734 computationally utilize a neural net embedding in processing
736 computationally detect a spike 476
738 computationally utilize a scoring principle or scoring condition during processing
740 computationally allow access 210 to a secured item 204
742 computationally bar access 210 to a secured item 204
744 computationally defer access 210 to a secured item 204, e.g., by increasing an authorization or authentication requirement for access
746 computationally run (execute) a model 216
748 computationally detect an anomaly, in the form of an access request or other actions 724
750 any step discussed in the present disclosure that has not been assigned some other reference numeral
800 data flow diagram; 800 also refers to risk mitigation methods illustrated by or consistent with the FIG. 8 diagram
802 human approver, human decision-maker
804 email
806 JIT access (result or workflow)
808 automatic approval of a request; done computationally
810 manual approval or denial of a request; done by a person but result is entered to a system 102
812 threat level; digital value
814 computationally sort requests for manual or automatic handling
818 computational feedback loop
820 computationally gather feedback data
822 implicit feedback

CONCLUSION

In short, the teachings herein provide a variety of risk mitigation functionalities which operate in enhanced systems 200. Cybersecurity is enhanced, with particular attention to risks from access requests 208 originating inside an organization. Access 210 to secured items 204 in a computing system 202 is requested instead of being persistent. Access requests 208 may be granted 740 on a just-in-time basis 806. Anomalous access requests 208 are detected 748 using machine learning models 216 based on historic patterns 316. Models 216 utilizing conditional probability 302 or collaborative filtering 306 also facilitate the creation 718 of human-understandable explanations 468 of threat assessments. Individual machine learning models 216 are based on historic data of users 206, peers 320, cohorts 324, services 328, or resources 332. Models 216 may be weighted 702, and then aggregated 604 in a subsystem 214 to produce an access request risk score 218. Scoring principles 334 and conditions 422 utilized in the scoring subsystem 214 may include probabilities 412, distribution entropies 416, and data item counts 420. A feedback loop 818 allows incremental refinement 704 of the subsystem 214. Anomalous requests 208 that would be automatically approved under a policy may instead be stepped up 502 to face human review 710, and low threat requests 208 that would have been delayed by human review 710 may instead be stepped down 504 and approved automatically.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 6 through 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed.

Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to mitigate cybersecurity risk from access requests, the system comprising:
a digital memory;
a processor in operable communication with the digital memory, the processor configured to perform cybersecurity risk mitigation steps including automatically obtaining from an explanatory machine learning model subsystem an explainable anomaly-based risk score of a request by a requestor for access to a secured resource or a secured service or both, selecting an approval procedure based on at least the explainable anomaly-based risk score, the approval procedure being selected from a set of multiple approval procedures which includes at least one step-up approval procedure which upon computational execution compels presentation of the request to a non-requestor for human review prior to approval of the request and at least one step-down approval procedure which upon computational execution avoids presentation of the request for human review prior to approval of the request, submitting the request to the selected approval procedure, getting an access decision from the approval procedure, implementing the access decision in at least one of the following ways: allowing the requested access, barring the requested access, or deferring access by submitting the request to additional approval processing, the cybersecurity risk mitigation steps also including automatically computing a black box risk score using a black box machine learning model, determining that the black box risk score is within a predetermined tolerance of the explainable anomaly-based risk score, and then displaying an explanation of at least one risk, the explanation being automatically derived from at least one of the following: an input to the explanatory machine learning model subsystem, or an output of the explanatory machine learning model subsystem.

2. The system of claim 1, wherein the system comprises the explanatory machine learning model subsystem, and the explanatory machine learning model subsystem comprises at least one of the following:
   a conditional probability machine learning model;
   a collaborative filtering machine learning model; or
   an explanatory artificial intelligence machine learning model.

3. The system of claim 1, wherein the request asks that access be granted to a requestor, the system comprises the explanatory machine learning model subsystem, and the explanatory machine learning model subsystem comprises at least one of the following:
   a user model based at least in part on historical access patterns of the requestor;
   a peer model based at least in part on historical access patterns of peers of the requestor, each peer being a direct report of a particular manager;
   a cohort model based at least in part on historical access patterns of cohorts of the requestor, each cohort having an equivalent job responsibility access level;
   a service model based at least in part on historical access patterns of access to the secured service; or
   a resource model based at least in part on historical access patterns of access to the secured resource.

4. The system of claim 1, wherein the system comprises the explanatory machine learning model subsystem, and the explanatory machine learning model subsystem utilizes at least one of the following as a scoring principle:
   a probability that a given attribute will appear in the request;
   an entropy measure of uncertainty in a distribution of access requests; or
   a count of prior access requests which have a given attribute.

5. The system of claim 1, wherein the system comprises the explanatory machine learning model subsystem, and the system utilizes at least two of the following as an input signal to a machine learning model of the explanatory machine learning model subsystem or as a scoring condition, or both:
   a channel identification which uniquely identifies a channel that carried the request;
   a channel category of a channel that carried the request;
   a domain identification which uniquely identifies a source domain of the request;
   a domain category of a source domain of the request;
   a subnet identification which uniquely identifies a source subnet of the request;
   a subnet category of a source subnet of the request;
   an IP address which uniquely identifies a source of the request;
   an IP address category of a source of the request;
   a resource identification which uniquely identifies the secured resource;
   a resource category of the secured resource;
   a request resource count which indicates a number of resources the requestor seeks to access through the request;
   a request resource level which indicates a resource access level the requestor seeks through the request;
   a personnel identification which uniquely identifies the requestor;
   a personnel category of the requestor;
   a service identification which uniquely identifies a service that contains the secured resource or is otherwise secured;
   a service category of a service that contains the secured resource or is otherwise secured;
   a requestor risk score;
   a resource risk score; or
   a service risk score.

6. A method for mitigating cybersecurity risk from access requests, comprising:
   receiving a request for access to a secured resource or a secured service or both;
   computing an explainable anomaly-based risk score of the request using an explanatory machine learning model, the explainable anomaly-based risk score being computed based on at least a weighted combination of historical access pattern models;
   selecting an approval procedure based on at least the explainable anomaly-based risk score;
   submitting the request to the selected approval procedure;
   getting an access decision from the approval procedure;
   providing the access decision to an access control infrastructure which is configured to implement the access decision;
   computing a black box risk score using a black box machine learning model; and
   determining that the black box risk score is within a predetermined tolerance of the explainable anomaly-based risk score, and then displaying an explanation of at least one risk, the explanation being automatically derived from at least one of the following: an input to the explanatory machine learning model, or an output of the explanatory machine learning model.

7. The method of claim 6, wherein the selecting is also based on at least one of:
   a request resource count which indicates a number of resources the requestor seeks to access through the request;
   a request resource level which indicates a resource access level the requestor seeks through the request;
   a personnel identification which uniquely identifies the requestor;
   a personnel category of the requestor; or
   a requestor risk score.

8. The method of claim 6, wherein each historical access pattern model has an associated predicted probability and also has an associated measure of distribution entropy, and computing the explainable anomaly-based risk score includes weighting the predicted probability of each model according to the entropy measure of that model.

9. The method of claim 6, further comprising displaying an explanation of the computed explainable anomaly-based risk score, the explanation automatically derived from a comparison of the request to at least one historical access pattern.

10. The method of claim 6, wherein the method further comprises retraining the explanatory machine learning model using at least the access decision.

11. The method of claim 6, wherein the explanatory machine learning model utilizes at least one of the following as a scoring principle: a probability that a given attribute will appear in the request, or an entropy measure of uncertainty in a distribution of access requests.

12. The method of claim 6, further comprising ascertaining that the request has an entropy above a specified threshold, and then selecting an approval procedure which avoids alerting on the request.

13. The method of claim 6, wherein the request asks that access be granted to a requestor, and the method further comprises at least one of the following:
   automatically revoking access by the requestor in response to an action taken by the requestor after the access decision granted the request;
   automatically increasing security monitoring of the requestor in response to an action taken by the requestor after the access decision granted the request; or
   automatically increasing security monitoring of the secured resource or the secured service or both in response to an action taken by the requestor after the access decision granted the request.

14. The method of claim 6, wherein the selected approval procedure produces the access decision based on at least a rule or a policy which is defined without reference to the explainable anomaly-based risk score.

15. The method of claim 6, wherein the method computes the explainable anomaly-based risk score utilizing a user-resource embedding to model for anomalous access.

16. A computer-readable storage device configured with data and instructions which upon execution by a processor cause a cloud computing system to perform a method for mitigating cybersecurity risk from access requests, the method comprising:
   receiving a request for access to a secured resource or a secured service or both;
   computing an explainable anomaly-based risk score of the request using an explanatory machine learning model, the explainable anomaly-based risk score being computed in a machine learning model subsystem using at least one machine learning model;
   ascertaining that the request has an entropy above a specified threshold, the entropy including a measure of uncertainty in a distribution of access requests;
   selecting an approval procedure which upon execution avoids alerting on the request and which is selected based on at least the explainable anomaly-based risk score;
   submitting the request to the selected approval procedure;
   getting an access decision from the approval procedure;
   providing the access decision to an access control infrastructure which is configured to implement the access decision;
   computing a black box risk score using a black box machine learning model; and
   determining that the black box risk score is within a predetermined tolerance of the explainable anomaly-based risk score, and then displaying an explanation of at least one risk, the explanation being automatically derived from at least one of the following: an input to the explanatory machine learning model, or an output of the explanatory machine learning model.

17. The storage device of claim 16, wherein the method comprises sending an alert toward a stakeholder in response to an anomalous access request.

18. The storage device of claim 16, wherein the request asks that access be granted to a requestor, and the method comprises detecting a spike in requests from the requestor.

19. The storage device of claim 16, wherein the method utilizes at least four of the following items as a machine learning model input signal or as a scoring condition, or both:
   a channel identification which uniquely identifies a channel that carried the request;
   a channel category of a channel that carried the request;
   a domain identification which uniquely identifies a source domain of the request;
   a domain category of a source domain of the request;
   a subnet identification which uniquely identifies a source subnet of the request;
   a subnet category of a source subnet of the request;
   an IP address which uniquely identifies a source of the request;
   an IP address category of a source of the request;
   a resource identification which uniquely identifies the secured resource;
   a resource category of the secured resource;
   a request resource count which indicates a number of resources the requestor seeks to access through the request;
   a request resource level which indicates a resource access level the requestor seeks through the request;
   a personnel identification which uniquely identifies the requestor;
   a personnel category of the requestor;
   a service identification which uniquely identifies a service that contains the secured resource;
   a service category of a service that contains the secured resource;
   a requestor risk score;
   a resource risk score; or
   a service risk score.

20. The storage device of claim 19, wherein the method utilizes at least six of the items as a machine learning model input signal or as a scoring condition, or both.